(12) United States Patent
Balemi et al.

(10) Patent No.: US 7,865,338 B2
(45) Date of Patent: Jan. 4, 2011

(54) SUPPRESSION OF VIBRATIONS

(75) Inventors: Silvano Balemi, Tenero (CH); Martin Wild, Weisslingen (CH); Marc Thuillard, Uetikon Am See (CH)

(73) Assignee: Belimo Holding AG, Hinwil (CH)

( * ) Notice: Subject to any disclaimer, the term of this patent is extended or adjusted under 35 U.S.C. 154(b) by 149 days.

(21) Appl. No.: 11/910,797

(22) PCT Filed: Mar. 21, 2006

(86) PCT No.: PCT/CH2006/000170

§ 371 (c)(1),
(2), (4) Date: Dec. 18, 2007

(87) PCT Pub. No.: WO2006/105677

PCT Pub. Date: Oct. 12, 2006

(65) Prior Publication Data

US 2009/0143919 A1  Jun. 4, 2009

(30) Foreign Application Priority Data

Apr. 7, 2005  (CH) .................................... 0633/05

(51) Int. Cl.
| H03F 1/26 | (2006.01) |
| H04B 15/00 | (2006.01) |
| G06F 19/00 | (2006.01) |
| G01F 23/00 | (2006.01) |
| G01L 7/00 | (2006.01) |
| G01N 11/00 | (2006.01) |
| G05B 21/00 | (2006.01) |
| G05B 13/00 | (2006.01) |
| G05B 15/00 | (2006.01) |
| F04B 11/00 | (2006.01) |
| G10K 11/16 | (2006.01) |

(52) U.S. Cl. ......................... 702/191; 702/56; 700/280; 417/540; 381/71.2; 381/71.5; 381/71.11; 381/71.12; 381/71.14

(58) Field of Classification Search .................. 700/280; 702/56, 191–195; 417/540; 340/853.2; 381/71.1, 381/71.2, 71.5, 71.7, 71.11, 71.12, 71.14; 267/136, 137, 140.13–140.15
See application file for complete search history.

(56) References Cited

U.S. PATENT DOCUMENTS 3,961,234 A     6/1976  Chambers
4,285,315 A  *  8/1981  Douaud et al. ......... 123/406.42

(Continued)

FOREIGN PATENT DOCUMENTS

CH       692637 A5  *  8/2002

(Continued)

*Primary Examiner*—Crystal J Barnes-Bullock
(74) *Attorney, Agent, or Firm*—Thaddius J. Carvis

(57) ABSTRACT

Disclosed are a method and a device for suppressing vibrations (18) in an installation comprising an actuator (14) for actuating a flap (12) or a valve (70) used for metering a gas or liquid volume flow (16), especially in the area of HVAC, fire protection, or smoke protection. Vibrations (18) of the flap (12) or valve (70) caused by an unfavorable or wrong adjustment or configuration of the controller and/or by disruptive influences are detected and dampened or suppressed by means of an algorithm (1) that is stored in a microprocessor (49). Said algorithm is preferably based on the components recognition of vibrations (46), adaptive filtering (48), and recognition of sudden load variations (50).

11 Claims, 3 Drawing Sheets

U.S. PATENT DOCUMENTS

| | | |
|---|---|---|
| 4,980,625 A | 12/1990 | Shimada |
| 5,016,730 A * | 5/1991 | Kaiser et al. ................. 181/265 |
| 5,098,263 A * | 3/1992 | Hattori et al. ................ 417/540 |
| 5,628,499 A * | 5/1997 | Ikeda et al. ............. 267/140.14 |
| 5,774,564 A * | 6/1998 | Eguchi et al. ............. 381/71.11 |
| 5,912,821 A * | 6/1999 | Kobayashi ................... 700/280 |
| 6,026,338 A * | 2/2000 | Borschert et al. ............. 701/37 |
| 6,264,111 B1 | 7/2001 | Nicholson |
| 6,298,883 B1 * | 10/2001 | Kinzel ........................ 138/108 |
| 6,668,806 B2 * | 12/2003 | Miller ........................ 123/509 |
| 6,676,117 B2 * | 1/2004 | Desmoulins et al. ... 267/140.13 |
| 6,741,185 B2 * | 5/2004 | Shi et al. ................. 340/853.2 |
| 6,789,529 B2 * | 9/2004 | Suzuki et al. ............... 123/509 |
| 6,847,874 B2 * | 1/2005 | Stiller ........................ 701/37 |
| 7,063,942 B2 * | 6/2006 | Dancu et al. ................... 435/1.1 |
| 7,226,082 B2 * | 6/2007 | Muramatsu et al. ......... 280/775 |
| 7,234,576 B2 * | 6/2007 | Sirven ........................ 188/314 |
| 7,290,440 B2 * | 11/2007 | Gocho ........................ 73/49.2 |
| 7,662,290 B2 * | 2/2010 | Stark .......................... 210/652 |
| 2001/0002097 A1 | 5/2001 | Tsutsui |

FOREIGN PATENT DOCUMENTS

| | | |
|---|---|---|
| EP | 290787 A1 * | 11/1988 |
| EP | 412853 A2 * | 2/1991 |
| EP | 0469617 A1 | 5/1992 |
| JP | 2001141108 A * | 5/2001 |
| JP | 2001173713 A * | 6/2001 |
| JP | 2003267023 A * | 9/2003 |

* cited by examiner

SUPPRESSION OF VIBRATIONS

The application is a 35 USC 371 of PCT/CH2006/000170 filed Mar. 21, 2006 which claims the benefit of Switzerland application 633/05 filed Apr. 7, 2005.

FIELD OF THE INVENTION

The invention relates to a method and a device for the suppression of vibrations in a system having an actuating drive for actuating a flap or a valve for the dosing of a gas or liquid volume flow, in particular in the field of HVAC, fire or smoke protection.

BACKGROUND OF THE INVENTION

In practice, regulating circuits having actuating drives for flaps and valves in the field of HVAC continually begin to vibrate. A vibration of said type can be of short duration, for example during start-up, but also occurs because regulating circuits can never be set to be stable. This leads to an early failure of actuating drives, and the latter must be repaired or replaced before the expected service life has expired. It is therefore in the interests of suppliers and customers that early failures of said type are prevented.

In order that vibrations can occur, two conditions in particular must be met:
- amplitude condition: the gain of the entire system must be at least equal to 1.
- phase condition: there must be a time lag in the system which is sufficiently large.

A vibration remains in the steady state if, in the case of a total gain of at least 1, the phase shift of the entire system is 360°.

The undesired vibrations can therefore differ not only in frequency but also in amplitude. If intense non-linearities are involved, as is the case for example with unfavorably-designed valves, a vibration can thus generally occur only in certain operating ranges of a system. Depending on this, the amplitude of a steady-state vibration can also be different. If a regulator is set in a grossly incorrect manner, a vibration can encompass the full range of an actuating signal until it is limited by the restricted output range of the regulator. In said limit case, the vibration can also be rectangular or approximately rectangular.

In U.S. Pat. No. 6,264,111 A, the gain of a regulator, the so-called P component, is adjusted. If the gain of the entire system, for example regulator, actuating member, air conditioning system, room and sensor, is small enough, then the vibration disappears. The means for suppressing the vibration are integrated directly in the regulator, and the input and output variables of the regulator are always known. It is possible using different means, also adaptive means, to suppress or eliminate vibrations, though it is in part necessary to accept significantly poorer regulating performance. Said degradation can be expressed for example in persistent temperature deviations or a very lethargic matching of the temperature.

BRIEF SUMMARY OF THE INVENTION

The inventors have set the object of creating a method and a device of the type specified in the introduction, by means of which vibrations in the system can be suppressed or eliminated without the regulating performance being noticeably degraded.

With regard to the method, the object is achieved according to the invention in that vibrations, which are generated by means of an unfavorable or incorrect setting or configuration of the regulation arrangement and/or by means of disturbing influences, of the flap or of the valve are detected, and damped or suppressed, by means of an algorithm stored in a microprocessor.

Special and refining embodiments of the method are the subject matter of dependent patent claims.

The algorithm according to the invention is based on three components:
- vibration detection
- adaptive filtering
- step detection For vibration detection, that is to say in order to determine the frequency of a vibration, the minima and maxima of the signal are sought and the time interval in between these is measured (extreme value analysis). This however often leads to imprecise or even incorrect results if the signal simultaneously contains a plurality of frequencies. In order to avoid such false results, a new method called wavelet analysis is introduced. Said method is described in detail by the co-inventor M. Thuillard in the publication "Wavelets in Soft Computing", World Scientific Press, 2002. In very broad terms, said wavelet analysis involves a greatly simplified Fourier analysis which, with basic mathematical operations by means of a simple microprocessor, leads to the goal. Here, a small number of frequency ranges are defined, thereby fixing a coarse raster. A wavelet analysis highlights the region of said raster in which most of the energy of the signal is situated. This makes it possible to check whether the extreme value analysis which was originally carried out was correct. In the case of an excessively large deviation, on the basis of the wavelet analysis, an assumption for the vibration frequency is generated, and it is decided whether or not the vibration suppression should be activated at all.

Within the context of adaptive filtering, a phase-reducing element, a so-called lag element, is selected in order to reduce the gain or the amplitude of the vibration of the system. The lag element selected for the approach has the following properties:
- in the event of very slow, low-frequency changes in the control signal, the gain of the system is not influenced.
- in the event of faster, high-frequency changes in the control signal, the gain is reduced, and the signal is damped.
- From a certain frequency of the control signal, the amplitude remains approximately constant at a minimum value, and the damping therefore remains at a maximum value.

A Bode diagram which is known to a person skilled in the art is expediently used for a graphic description of the adaptive filtering, in which Bode diagram the amplitude and the angle of a signal, or the gain and the damping, are illustrated in each case as a function of the frequency. A lag element is the core of the vibration suppression. Said lag element must be correctly parameterized; this involves defining the cut-off frequencies of the lag element, for which purpose the frequencies of the vibration which is to be damped must be known.

The lag element is parameterized and activated with cut-off frequencies determined from the Bode diagram. In general, the filter now already operates in approximately the correct frequency band. Should this not yet be optimal, it is checked by means of the continuing vibration detection as to whether the vibration now decays as predefined. If not, the two cut-off frequencies are periodically moved in the direction of lower frequencies, thereby increasing the damping action for the vibration frequency. The movement of the filter frequency is associated with a change in the phase shift, so that both conditions for the occurrence of vibrations, the amplitude condition and the phase condition, are varied until one of the conditions is no longer met and the vibration decays. The algorithm therefore operates in a self-adaptive manner.

The lag element damps fast changes in the actuating signal, as a result of which the drive no longer reacts quickly enough in all cases to desired steps in the actuating signal. For example, if someone turns an adjustment knob for the room temperature, such steps must be detected and passed on to the drive. In other words, the step detection arrangement must, in the event of a desired step, deactivate the lag element again so that a step can be made immediately in an accompanying fashion. After the step, the entire algorithm starts from the beginning.

Alternatively, the cut-off frequencies of the lag element are temporarily moved in the direction of higher frequencies, and then successively reduced again.

The preferred functions of the algorithm according to the invention can be summarized as follows:

- The vibrations in the system are adaptively, preferably self-adaptively, filtered, with a lag element, which is parameterized by means of cut-off frequencies, expediently being used as a filter.
- In the case of vibrations which do not decay as predefined, the two cut-off frequencies of the lag element are periodically moved in the direction of lower filter frequencies, and the damping for the vibration frequency is thereby increased.
- If a load step is detected, the lag element is immediately deactivated or re-parameterized, and the step is made in an accompanying fashion.
- The flap and/or valve characteristic is dynamically linearized.
- Vibrations in the range from 1 to 1800 seconds' duration, preferably from 30 to 300 seconds' duration, are detected, and damped or suppressed.
- Vibrations of a flap up to an angle $\Delta\phi$ and/or of a valve up to a lift $\Delta h$, of the maximum actuating range, are detected, and damped or suppressed.

The algorithm used according to the invention is preferably software-programmed and operates without configuration requirements. It additionally provides information regarding the vibration characteristic, in particular mean values, amplitudes and/or frequencies, for analysis.

With regard to the device for carrying out the method, the object is achieved according to the invention in that a microprocessor with algorithms for vibration suppression and linearization is arranged in the actuating drive.

The arrangement of the vibration suppression arrangement in the actuating drive ensures reliable functioning of the system with all commercially available regulators. The disadvantage specified in the introduction, that vibration suppression arrangements accommodated in a regulator lead to a significantly degraded regulating performance, is therefore eliminated.

BRIEF DESCRIPTION OF THE DRAWINGS

The invention is explained in more detail on the basis of exemplary embodiments which are illustrated in the drawing and are also the subject matter of dependent patent claims. In the drawing, in each case schematically:

DETAILED DESCRIPTION OF THE INVENTION

Figure 1:
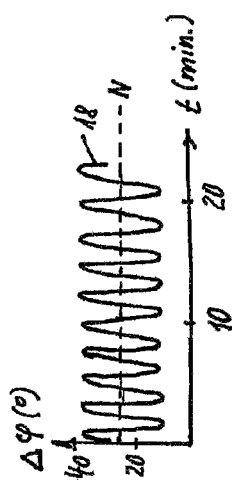
FIG. 1 shows a pivotable flap in a ventilation pipe.

FIG. 1 shows a detail of a ventilation pipe 10 with an installed flap 12 which is pivotable under the action of an electromotive actuating device 14. A gas volume flow 16, in the present case an air flow, which is illustrated with an arrow is blown through the ventilation pipe 10. The flap which is embodied according to the prior art vibrates about an angle $\Delta\phi$ of approximately $\pm 15°$, and a vibration period is approximately two minutes.

Figure 2:
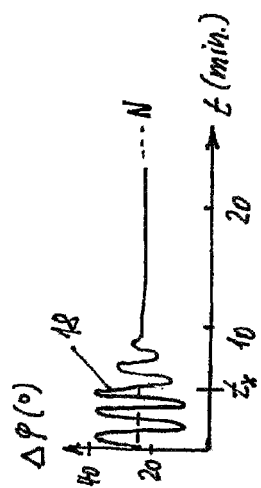
FIG. 2 shows uninfluenced vibrations of the flap as per FIG. 1.

In FIG. 2, the vibrations 18 are plotted with regard to their amplitude proportional to the angle $\Delta\phi$ as a function of the time t, with the amplitude $\Delta\phi$ corresponding to the deviation from the central normal position N. The vibrations 18 lie substantially on a horizontal band with parallel edges.

Figure 3:
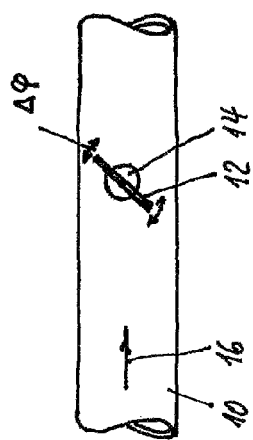
FIG. 3 shows the flap as per FIG. 1 with vibration suppression.
Figure 4:
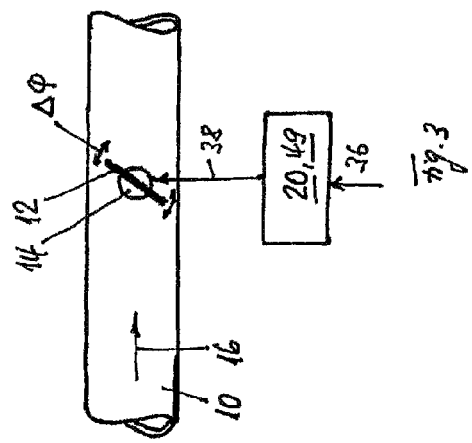
FIG. 4 shows damped vibrations of the flap as per FIG. 3.

FIG. 3 corresponds substantially to FIG. 1, but a vibration suppression arrangement 20 is connected upstream of the actuating drive 14. Said vibration suppression arrangement 20 passes a control signal 38, also referred to as an actuating variable, to the actuating drive 14. The profile is illustrated in FIG. 4; the vibrations initially run as in FIG. 2. After the time $t_x$, the actuating drive 14 receives control signals which immediately and effective dampen the vibrations 18, and the maximum amplitude deflections decay until a normal position N is reached. This significantly lengthens the service life of the drives.

Figure 5:
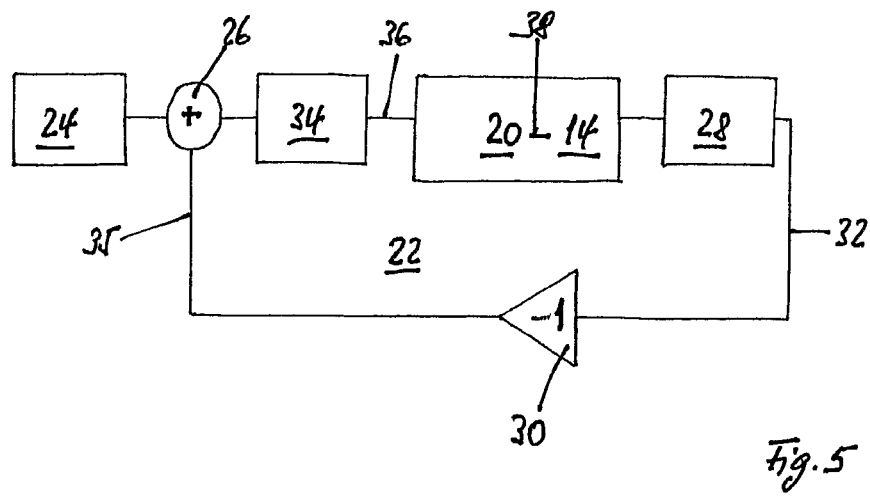
FIG. 5 shows a typical regulating circuit.

A regulating circuit 22 illustrated in FIG. 5 has a vibration suppression arrangement 20 which simultaneously serves to provide linearization and which is arranged in the actuating drive 14.

A nominal value transducer 24 feeds predefined control signals into a comparing element 26 of a regulator 34, and at the same time receives the actual value of a feedback variable 35 which corresponds to the regulating variable 32 which is output from a regulating path 28 and is passed via a signal inverter 30. The regulator 34 calculates a regulator output variable 36 and feeds the latter into an adaptive filtering arrangement (48 in FIGS. 6, 7) with the algorithm of the vibration suppression arrangement 20.

If the vibration detection arrangement 46 (in FIGS. 6, 7) of the vibration suppression arrangement 20 detects vibrations, it generates a control signal 38 or an actuating variable for the actuating drive 14 with the integrated vibration suppression arrangement 20, as a result of which the vibrations 18 are immediately damped (FIG. 4). According to a variant which is not illustrated, the vibration suppression arrangement 20 can also be arranged separately outside the actuating drive 14.

Figure 6:
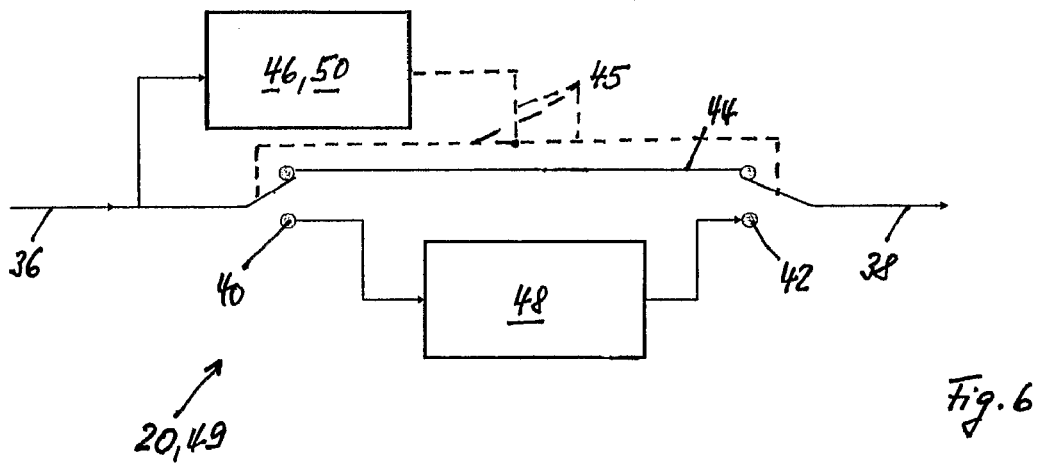
FIG. 6 shows a vibration suppression arrangement in the rest state.

A vibration suppression arrangement 20 illustrated in FIG. 6, substantially a microprocessor 49, is illustrated in the rest position. Two logic switches 40, 42 are set such that a signal, the regulator output variable 36, is supplied via a direct signal path 44 as an actuating variable 38 to the actuating drive 14. A vibration detection arrangement 46 having a load step detection arrangement 50 in the same block constantly monitors the regulator output signal 36 for any vibrations 18 (FIG.

2). An adaptive filtering arrangement 48 is deactivated. There is a logic connection 45, illustrated by dashed lines, between the vibration detection arrangement 46 and the switches 40, 42.

Figure 7:
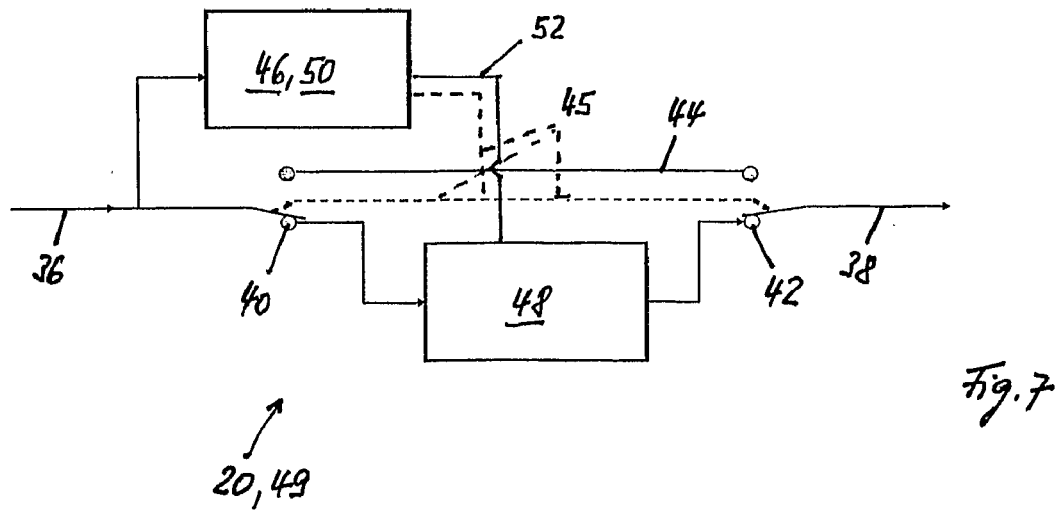
FIG. 7 shows a vibration suppression arrangement with the algorithm activated.

In the illustration of the vibration suppression arrangement 20 as per FIG. 7, the vibration detection arrangement 46 has detected vibrations of the system which lie above the tolerance. The two logic switches 40, 42 switch, and the regulator output variable 36 is now supplied to the adaptive filtering arrangement 48 with the algorithm. The adaptive filtering arrangement 48 is supplied by means of a logic connection 52 with the filter parameters obtained by means of the vibration detection arrangement 46. The algorithm of the adaptive filtering arrangement 48 contains, in the present case, a lag element. In this way, vibration damping is initiated which continues until the disturbance is eliminated and the vibration detection arrangement switches back to the arrangement as per FIG. 6.

According to an embodiment which is not illustrated, the switch 40 can be replaced by a conventional branch.

Figure 8:
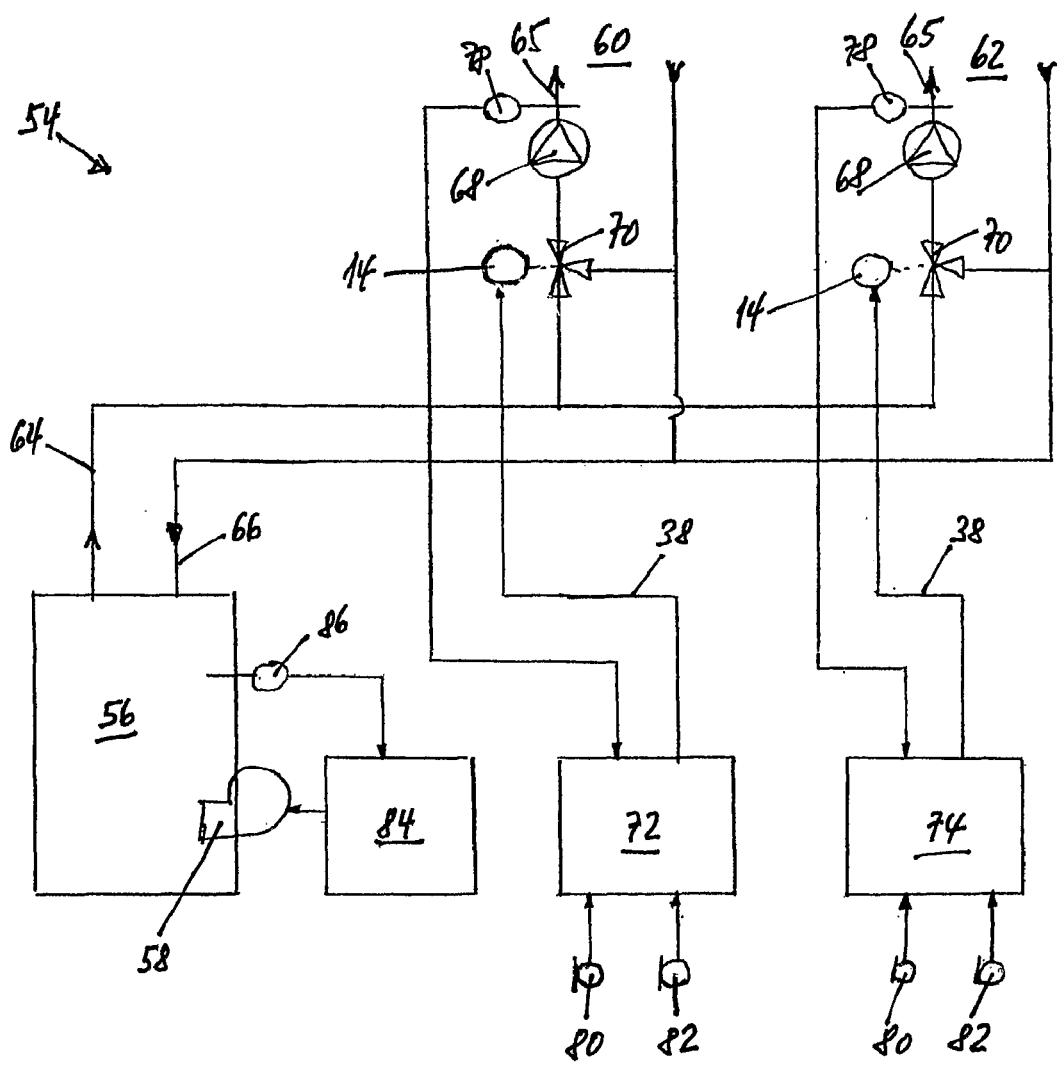
FIG. 8 shows a heating system.

A heating system 54 illustrated in FIG. 8, as is used for example for a double-bedroom detached house, comprises a heating boiler 56 having a burner 58 and two heating circuits 60, 62 with a common feed line 64 and return line 66 which lead to the heating boiler. The two heating circuits 60, 62 are fed by in each case one circulation pump 68; a part of the returning water can be admixed into the feed line 65 of the relevant heating circuit 62 by means of a mixing valve 70. The mixing valves 70 have an electric actuating drive 14 which receives actuating signals 38 from the relevant heating circuit regulator 72, 74. The heating circuit regulators 72, 74 receive signals from a temperature sensor 78 in the heating circuits 60, 62, a room temperature gauge 80 and an outdoor temperature gauge 82.

An on-off boiler regulator 84 regulates the water temperature of the heating boiler 56 by virtue of a temperature sensor 86 activating and deactivating the burner 58. Here, vibrations can be generated which are unavoidable. The heating circuit regulators 72, 74 attempt to compensate the fluctuating boiler temperature by means of corresponding actuating signals 38 to the actuating drives 14 of the mixing valves 70.

Figure 9:
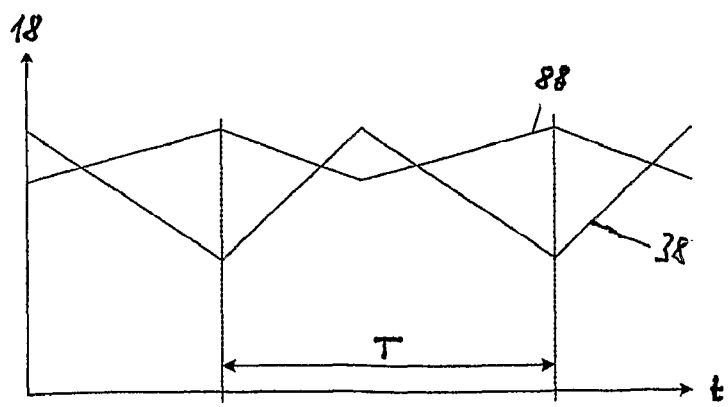
FIG. 9 shows vibrations generated by means of the boiler regulator of FIG. 8.

The profiles of the boiler temperature 88 and of the actuating signal 38 for the actuating drives 14 of the mixing valves 70 are illustrated in FIG. 9 as a function of the time t. The period T of a vibration 18 fluctuates greatly within a system as a function of the meteorological conditions, and typically lies in a range from approximately ten minutes to two hours. The actuating signal 38 for the actuating drives 14 of the mixing valve 70 oscillates about a central value N (FIGS. 2, 4), with no extreme steps being expected.

In the case of floor heating systems, the actuating drive 14 may remain in the central position without any loss of comfort. In the case of radiator heating systems, it is at the most possible to notice a slight variation in the radiator temperature. In the case of air heaters, in contrast, the actuating drive 14 for the mixing valve 70 must perform a correcting movement, since unpleasant, noticeable temperature fluctuations otherwise occur. Further fluctuations 18 in the heating system 54 as per FIG. 8 can have various causes:

As a result of inadequate assembly, the outdoor temperature gauge 82 can be exposed to direct sunlight. In the event of changeable weather, this can lead to intense fluctuations in the measured outdoor temperature, and therefore to vibrations. The heating circuit regulators 72, 74 attempt to compensate this.

Disturbing influences in the indoor temperature measured by means of the room temperature gauge 80 can also occur as a result of fluctuating exposure to direct sunlight. The heating circuit regulators 72, 74 also attempt to compensate said disturbance.

As a result of defective hydraulic decoupling of the two heating circuits 60, 62, the one heating circuit can be influenced by the other. The two heating circuits can incite vibrations in one another.

In the case of an incorrectly configured regulator, it is possible for vibrations to be generated on account of the incorrect settings for the P-band or the reset time. The periods of the vibrations are system-specific, and are generally approximately three to five minutes.

According to a variant of FIG. 8 which is not illustrated but is preferred, a vibration suppression arrangement 20 is integrated into the actuating drive 14 for the mixing valves 70 of the two heating circuits 60, 62, which vibration suppression arrangement 20 detects and eliminates undesired steady-state vibrations.

The invention claimed is:

1. A method for dosing a gas or liquid volume flow in a pipe of a regulating path comprising the steps of:
    providing a regulating variable from the regulating path, said regulating variable corresponding to the effective liquid volume flow,
    providing a predefined control signal corresponding to the required liquid volume flow,
    comparing said predefined control signal and said regulating variable and calculating therefrom a regulator output variable,
    monitoring the regulator output variable by a vibration detection algorithm,
    if the vibration detection algorithm does not detect vibrations of the regulator output variable
    feeding said regulator output variable to an actuating device which is actuating a flap or a valve in the pipe for dosing the gas or liquid volume flow
    if the vibration detection algorithm detects vibrations of the regulator output variable
        feeding the regulator output variable to an adaptive filter and
        the adaptive filter suppressing the vibration and generating a control signal with suppressed or damped vibrations of the regulator output variable,
    feeding the control signal to the actuating device instead of the regulator output variable.

2. The method as claimed in claim 1, characterized in that the vibration detection supplies filter parameters to the adaptive filter.

3. The method as claimed in claim 2, characterized in that the vibration detection algorithm is configured to detect vibrations in the range from 30 to 300 seconds duration and that the filter parameters that are supplied to the adaptive filter generate damping or suppressing vibrations in said range from 30 to 300 seconds duration in the control signal.

4. The method as claimed in claim 1, characterized in that the vibration detection arrangement carries out a wavelet analysis in addition to an extreme value analysis of the regulator output variable in order to determine a frequency of the vibration.

5. The method as claimed in claim 1, characterized in that the adaptive filter comprises a lag element, which is parameterized by means of cut-off frequencies.

6. The method as claimed in claim 5, characterized in that, if the vibration detection algorithm detects vibrations of the regulator output variable in the case of vibrations which do not decay as predefined, the cut-off frequencies of the lag element are periodically moved in the direction of lower filter frequencies, and the damping for the vibration frequency is thereby increased.

7. The method as claimed in claim 1, characterized in that if the vibration detection algorithm detects a load step, it immediately deactivates or reparameterizes the adaptive filter so that load step is transmitted to the actuating device.

8. The method as claimed in claim 1, characterized in that the adaptive filter algorithm dynamically linearizes the flap and/or valve characteristic.

9. The method as claimed in claim 1, characterized in that the vibration detection algorithm is configured to detect vibrations in the range from 1 to 1800 seconds duration and that the filter parameters that are supplied to the adaptive filter generate damping or suppressing vibrations in said range of from 1 to 1800 seconds duration in the control signal.

10. The method as claimed in claim 1, characterized in that the vibration detection algorithm is configured to detect vibrations up to a predetermined angle $\Delta\phi$ of the maximum actuating range of the flap or up to a predetermined lift $\Delta h$ of the maximum actuating range of the valve and that the filter parameters that are supplied to the adaptive filter generate damping or suppressing vibrations up to said predetermined angle $\Delta\phi$ and up to said predetermined lift $\Delta h$.

11. A device for dosing a gas or liquid volume flow in a pipe of a regulating path comprising:

means for providing a regulating variable from the regulating path, said regulating variable corresponding to the effective liquid volume flow,
a transducer for providing a predefined control signal corresponding to the required liquid volume flow,
a comparing element connected to the means for providing a regulating variable and to the transducer for comparing said predefined control signal and said regulating variable,
a regulator connected to said comparing element for calculating a regulator output variable,
a vibration detection algorithm connected to said regulator and monitoring the regulator output variable,
an actuating device actuating a flap or a valve in the pipe for dosing the gas or liquid volume flow, wherein the regulator output is connected to the actuating device if the vibration detection algorithm does not detect vibrations of the regulator output variable,
an adaptive filter connected to the vibration detection algorithm, wherein said adaptive filter is connected to the regulator and to the actuating device if the vibration detection algorithm detects vibrations of the regulator output variable, and wherein the adaptive filter is configured to generate a control signal with suppressed or damped vibrations of the regulator output variable and feeds said control signal to the actuating device.

* * * * *